United States Patent Office 3,541,068
Patented Nov. 17, 1970

3,541,068
DENTAL RESTORATIVE COMPOSITIONS
HAVING ENHANCED STABILITY
Charles W. Taylor, East Oakdale Township, Washington County, Minn., assignor to Minnesota Mining & Manufacturing Company, St. Paul, Minn., a corporation of Delaware
No Drawing. Continuation-in-part of application Ser. No. 713,318, Mar. 15, 1968. This application July 12, 1968, Ser. No. 744,326
Int. Cl. C08k 1/10; C08f 45/04
U.S. Cl. 260—41                                   6 Claims

ABSTRACT OF THE DISCLOSURE

Dental compositions are provided of inorganic particulate material as filler, N,N-bis(hydroxyalkyl)-3,5-xylidine as potential accelerator and acrylate or methacrylate esters of aromatic or unsaturated lower aliphatic diacid hemiesters with di- or tri-primary diols or triols as vehicles or binders. Polymerization is initiated in these combinations by free-radical generating catalysts.

---

This application is a continuation-in-part of copending application Ser. No. 713,318 filed Mar. 15, 1968.

This invention relates to novel moldable dental compositions in which polymerization is initiated by free-radical generating catalysts which compositions comprise novel accelerators. These compositions show improved stability on storage before use, i.e., shelf-life, as well as in color stability.

Dentists are becoming more and more cognizant of the psychlogoical effect of the appearance of teeth, of the mechanical and psychological benefits derived from restorations and of the necessity for providing durable restorations. The most satisfactory generally useful fillings that have been developed are based on the use of combinations of readily polymerizable organic vehicle-binder together with combinations of fillers. With proper compositions it is now possible to provide mimetic fillings for anterior teeth and, with other combinations, to provide fillings matching the general tooth color for posterior teeth with relatively limited shrinkage on polymerization and favorable characteristics of thermal expansion and compressive strength. Novel compositions are provided in the above indicated application which include vehicle-binders which have improved resistance to moisture under oral conditions and retain compressive strength after exposure to moisture. These compositions offer many advantages with relatively minor disadvantages. However, superior products are produced only by elimination of even relatively minor disadvantages. Certain of these disadvantages are associated with the use of dimethyl p-toluidine as accelerator because it is readily oxidized to give colored products which cause a degree of color instability. In addition its odor is somewhat objectionable and its vapor pressure is sufficiently high that the concentration may decrease on storage. The odor is more evident in resin compositions as provided in the above indicated application Ser. No. 713,318 which are themselves almost without odor. Odors largely disappear in any case after initiation and completion of polymerization.

It is an aim of this invention to provide novel compositions suitable for dental applications comprising solid inorganic fillers and organic binders comprising monomers containing polymerizable methacrylate groups which are essentially devoid of active-hydrogen containing groups and peroxides, and which compositions, after polymerization, have compressive strengths of the order of 24,000 p.s.i. or more both initially after polymerization and after exposure to moisture at 37° C. or oral conditions for periods of 6 months and more and additionally have low odor and better stability.

Other objects will become evident from reading the present disclosure.

It has been found that dental filling compositions, particularly those containing poly-1°-carbinol polymethacrylates as vehicle-binders are enhanced in color stability and improved in oder by using N,N-bis(hydroxy-lower-alkyl)-3,5-xylidines as accelerators for polymerization. An unexpected further property of these novel compositions is improvement in storage stability, that is prolongation of the time of freedom from gelling in the absence of peroxide catalyst.

In order that polymerization of dental filling compositions proceed rapidly after initiation, an accelerator for the polymerization is included as part of the binder in an appreciable amount. The amounts are adjusted so that initial setting is deferred for a few minutes, usually 2 or 3 to 5 or 7 minutes after mixing. This provides the time for mixing, depositing in a tooth cavity and consolidating before gelling or setting has advanced beyond a workable stage. Usually 0.5 to 2 mole percent of accelerator is dissolved in the binder which is used with about 74% filler. A more preferred proportion is about 0.2 to 0.5 weight percent for aromatic tertiary amines such as dimethyl p-toluidine. Higher molecular weight accelerators are used in somewhat higher weight proportions from 0.2 up to even 2.0 percent weight. It is desirable that the monomers be devoid of any peroxide compounds. A treatment with reducing agent prior to use is thus desirable. If this precaution is not taken shelf-life may be very short. It is found that N,N-bis(hydroxy-lower-alkyl)-3,5-xylidines may be used in these proportions with less chance for premature gellation and yet with more rapid attainment of adequate mechanical properties after gellation. The compositions including N,N-bis(hydroxy-lower-alkyl)-3,5-xylidines as accelerators thus offer advantages as compared to those including dimethyl p-toluidine in lower odor, better color stability, better stability on storage without gellation and more rapid achievement of mechanical strength after peroxide initiated gellation in tooth cavities.

The N,N-bis(hydroxy-lower-alkyl)-3,5-xylidines are available, for example, by reactions such as that described in the Journal of the American Chemical Society, vol. 82, page 1988 (1960) for xylidine and ethylene oxide by reaction of xylidine with homologous oxiranes, such as propylene oxide, butylene oxide. These xylidines are white crystalline solids which have low vapor pressures. So far as is known there would be no advantage to hydroxyalkyl groups above —$C_4H_8OH$ or higher homologs. An alternative procedure for introduction of omega-hydroxy alkyl groups is reaction with 2-bromoethanol, 3-bromopropanol or 4-bromobutanol.

The monomers employed as vehicles and binders are of very low volatility and hence have very little odor as compared to compositions including methyl methacrylate, acrylic acid and other such relatively odorous materials which masked the odor of amines, such as dimethyl p-toluidine in some heretofore employed dental composition. The odor of the latter aromatic amine is sufficiently strong as to be objectionable. The instant compositions are substantially free from this shortcoming. Such behavior is not unexpected nor is the enhanced color stability on aging. However, it is very surprising to find that the bis(hydroxy-lower-alkyl)xylidines provide improved shelf-life tability without partial gellation and, at the concentration levels employed, provide a more complete and efficient polymerization once gellation has been initiated by addition of catalyst.

The fillers employed in the compositions of the invention may include small amounts of pigments, either for visual color or fluorescent effect, glassy spherules or particles in small sizes, or crystalline materials such as lithium aluminum silicates, hydroxyapatite, etc. Particles should be generally smaller than 50 microns and preferably smaller than 30 microns. A commercially available lithium aluminum silicate is used in examples herein as providing an exemplary and generally valuable filler. As obtained particles range from submicron sizes up to 44µ with an average of about 2 to 15 microns. Other fillers may be used in somewhat different proportions and may have slightly different properties from the exact figures given.

It is preferred that the fillers be treated to promote adhesion by the binder, for example, using a conventional vinyl silane treatment or other such pretreatment.

It is found that the most satisfactory workable consistency for dental filling compositions is obtained when fillers having particle sizes in the average range of about 2 to 15 microns are milled with organic binder containing about 0.5 to 2 weight percent of tertiary amine accelerator, that is, N,N-bis(hydroxy-loweralkyl) - 3,5 - xylidine, in proportions of about 72 to about 78 percent by weight of filler and 28 to 22 percent of binder and accelerator together. The preferred range is 74.3% to 78% of filler. In both cases the lower percentages are used with more viscous binders. The exact proportions may be varied depending on individual preferences, temperature requirements, etc.

Mixing of binder and filler may be by any convenient method and desirably with as little occlusion of air bubbles as possible. Milling or kneading by generally available procedures provides adequate blending. Ball-milling may be less desirable when a spherular filler is included. It is also desirable to minimize inclusion of air during spatulation with catalyst before actually placing the polymerizing compositions in dental cavities.

It is not necessary that polycarbinol polymethacrylates be limited to those in which there is one dibasic acid residue. They may include none or larger polyester chains in which one or more diol residues are interposed between dibasic acid residues up to the point where the viscosity is not over about 10,000 centipoises. A low concentration of methacrylate groups (milliequivalents per gram of ester) is advantageous in decreasing shrinkage on polymerization although somewhat adversely affecting compressive strength. In general, therefore, the polyester methacrylate esters preferably do not have a very low molecular weight.

The polycarbinol polymethacrylate may be obtained by reaction of any type of intermediate, for example, a di- to trichloromethylated diphenyl ether may be converted to a polycarbinol polymethacrylate:

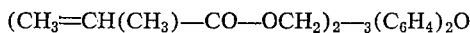

in which substituents are at least in the 4 and 4' positions and may include further substituents in a 2 position. The simple compound may be named 4,4'-bis(methacryloxymethyl) diphenyl ether.

A diol alone or with a triol may be partially reacted with a diacid and the residual carbinol groups then esterified by methacrylic acid or the diol and triol may be reacted separately. The resulting products are polyester methacrylate esters and are presently preferred as binders. In order to be assured of freedom from unesterified hydroxyl groups and hence of active hydrogen atoms all hydroxyl groups in diols and triols are present in primary carbinol groups —$CH_2OH$.

Crystalline polyester methacrylates are generally avoided. For example, the dimethacrylate of isophthalic acid bisdiethylene glycol hemiester tends to crystallize and it is preferable to include some terephthalic acid in the reaction. The corresponding orthophthalate is fluid and is quite satisfactory. The preparation of the latter is known from British Pat. 595,881 and also from the review article in Soviet Plastics, vol. 12, page 9 (1965) by Berlin et al. Modification is also possible by inclusion of more than one species of glyco, for example, a small amount of ethylene glycol together with diethylene glycol, or inclusion of up to about 50 mole percent of a lower triol.

The polyester methacrylate esters which are particularly useful in dental restorative compositions are represented by the general formula

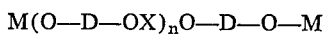

wherein M is methacrylate, D is alkylene of 2 to 8 carbon, bismethylene-cycloalkylene or 3-oxa-pentylene, $n$ is 1 to 2 and X is the residue of a diacid mono- or binuclear aromatic dicarboxylic acids of 8 to 19 carbon atoms and unsaturated dibasic aliphatic acids of up to 5 carbon atoms. Some exemplary acids are phthalic, isophthalic, terephthalic, fumaric, itaconic, benzophenonedicarboxylic, resorcinol diacetic, bisphenol A diacetic acid. Substituents which are present in the esters do not contain active hydrogen atoms. They are relatively non-volatile and substantially odorless. These polyester methacrylate esters have the further advantage of being of relatively low toxicity as demonstrated by tests in rabbits' eyes. They are therefore less likely to cause irritation of the pulp or nerve of a tooth. Their preparation and general characteristics are more fully described in the parent of this application, Ser. No. 713,318 and certain specific exemplary binders are shown in the following table.

TABLE.—DIMETHACRYLATES

| Example | Polycarbinol nucleus | | Brookfield viscosity, cps. | α,β unsat., meq./g. | $H_2O$ absorption not filled, 3,600 hours 37° C. in percent |
|---|---|---|---|---|---|
| | Acid | Glycol | | | |
| 1 | Phthalic | Ethylene glycol | 450 | 6.0 | |
| 2 | Fumaric | Diethylene glycol | 80 | 6.88 | 1.94 |
| 3 | Phthalic | 1,4-butanediol | 220 | 4.57 | |
| 4 | 2,4'-benzophenone dicarboxylic | Diethylene glycol | 250 | 5.05 | 1.89 |
| 5 | Itaconic | do | 54 | 6.90 | 2.87 |
| 6 | Isophthalic [1] | do | 240 | | |
| 7 | do | Diethylene glycol; 1,1,1-trimethylol-propane | 5,400 | | |
| 8 | Phthalic | Diethylene glycol | 156 | 4.40 | 1.87 |
| 9 | do | do | 1,940 | 2.61 | 0.81 |
| 10 | do | 1,4-cyclohexane dimethanol; 1,6-hexanediol | 486 | 3.57 | |
| 11 | do | 1,4-cyclohexane dimethanol | 9,120 | | |
| 12 | do | 1,6-hexanediol | 160 | 3.96 | |
| 13 | Bisphenol A diacetic | Diethylene glycol | 3,920 | 3.43 | |
| 14 | Itaconic | Cyclohexane-1,4 dimethanol | 900 | | 3.34 |
| 15 | Resorcinol diacetic | 1,6-hexanediol | 250 | | |
| 16 | | 4,4'-dimethylol diphenyl ether [2] | 540 | 5.9 | [2] 1.82 |

[1] A few percent of terephthalic acid effectively suppresses crystallinity.
[2] Including some of the 2,4,4'-trimethyl trimethacrylate; $H_2O$ absorption for 2,400 hours at 60° C.

The corresponding acrylates are also useful as binders in compositions of the invention.

A preferred class of polycarbinol polymethacrylate are those in which the polycarbinol nucleus includes aromatic rings.

Because it is economically unfeasible to wait for months or years for the results of tests under actual storage conditions, accelerated aging tests are carried out by storage of compositions at 60° C. Results do not give the actual life to be expected before gellation of the compositions in storage but indicate whether longer or shorter periods of shelf-life are to be expected for various aromatic tertiary amines. For convenience, the tests are run using only the organic binder and accelerator in the proportions of accelerator indicated in diethylene glycol phthalate bismethacrylate

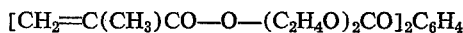

The weight proportions represent equimolar concentrations. Samples are stored in small screw cap bottles in an oven at 60° C. and examined intermittently to determine whether viscosity has increased or whether the material has gelled. In order to provide comparisons, parallel tests are run using other aromatic tertiary amines which are lower homologs or lack the hydroxy groups. The accelerator amines and gel-times at 60° C. are tabulated.

| Accelerator amine | Weight, percent | Gel time, hours at 60° C. |
|---|---|---|
| N,N-dimethyl p-toluidine | 0.5 | 21 |
| N,N-dimethyl p-toluidine | 0.5 | [1] 216 |
| N,N-bis(hydroxyethyl)-aniline | 0.67 | ([2]) |
| N,N-bis(hydroxyethyl)-p-toluidine | 0.72 | 21 |
| N,N-bis(hydroxyethyl)-3,5-xylidine | 0.776 | >1,700 |
| N,N-bis(2-hydroxypropyl)-3,5-xylidine | 0.87 | 408 |

[1] Binder treated to remove traces of peroxide.
[2] Turned deep blue.

In another series of tests the compositions of accelerator and binder (1.5 g. portions) are compared for the time necessary for gellation after adding to each one drop (0.04 g.) of 3.5% solution of benzoyl peroxide in methacrylic acid-methylmethacrylate (2:1). Reaction is quite rapid because the compositions contain no inorganic filler to absorb heat of reaction during early stages. In certain cases temperatures attained by the exotherm are measured. The results are tabulated below.

| Accelerator amine | Weight, percent | Gel time, sec. | Exotherm, °C. |
|---|---|---|---|
| N,N-dimethyl p-toluidine | 0.5 | 35 | 200 |
| N,N-bis(2-hydroxyethyl) aniline | 0.67 | ([3]) | ([3]) |
| N,N-bis(2-hydroxyethyl)p-toluidine | 0.72 | 35 | |
| N,N-bis(2-hydroxyethyl)p-toluidine | [1] 0.72 | 80 | 210 |
| N,N-bis(2-hydroxyethyl)-3,5-xylidine | 0.776 | 105 | 210 |
| N,N-bis(2-hydroxyethyl)-3,5-xylidine | [2] 0.50 | ([4]) | |
| N,N-bis(2-hydroxypropyl)-3,5-xylidine | 0.87 | 75 | |
| N,N-bis(3-hydroxypropyl)-3,5-xylidine | 0.88 | 145 | 190 |

[1] Polymer previously treated with reducing agent to remove peroxides.
[2] Lower percentage used in binder combined (24 parts binder and accelerator) with 76 parts of commercial finely divided lithium aluminum silicate as filler. Compressive strength after 24 hours at 37° C. in 100% relative humidity is 30,000 p.s.i.
[3] Poor cure after 15 minutes.
[4] 7 minutes.

The concentration of accelerators employed in compositions of this invention is preferably from about 0.5 to about 1.0 percent by weight of the vehicle-binder. For compositions having longer times for manipulation the amount may be decreased slightly but, generally increases above 1.0% give compositions that harden very rapidly and allow scarcely any time for manipulation. At these generally low concentrations the presence of hydroxyl groups in the accelerator appears not to be detrimental to water resistance of the compositions.

Compositions are prepared from 76 parts by weight of commercial finely divided lithium aluminum silicate said to be formed by calcination of petalite and therefore comprising a mixture in essentially undeterminable proportions of unreacted petalite, beta-spodumene and quartz. A small jar of about 100 ml. capacity is charged with 76.0 g. of lithium aluminum silicate and 24.0 g. of the particular binder free from peroxides but containing the desired percent by weight of N,N-bis(2-hydroxyethyl)-3,5-xylidine. About 16 steel balls (about 3.5 to 4.0 g. each) are included to assist in milling. On a larger scale these might be omitted or they may be replaced by ceramic balls which cause somewhat less coloration. the bottle is rolled at about 1 r.p.m. for about 36 hours.

Polymerization is brought about by using 1.5 g. of the above filled polymerizable combination with a drop (about 0.04 g.) of a free radical catalyst solution of about 4% benzoyl peroxide in methyl methacrylate (about 28%) and methacrylic acid (about 68%). The exact catalyst solution is not critical although the exact proportion is adjustable to give desired polymerization time. Mixing is effected using a spatula and material is immediately loaded into a suitable mold. Test samples for convenience are cylindrical samples about 6.2 mm. in diameter and 9.3 mm. long. The same compositions after addition of catalyst are readily used for filling cavities prepared in teeth. As a precaution, in vivo fillings may be placed over a cavity lining material. Cure of test samples is permitted to proceed for 24 hours at 37° C. and 100% relative humidity which simulates oral conditions. Compression strengths and the times required for initial gellation are tabulated.

| Accelerator in percent by weight of binder | Gellation time, min. | Compressive strength, lbs./in.[2] |
|---|---|---|
| 0.6 | 3.7 | 32,200 |
| 0.8 | 2.9 | 32,000 |
| 1.0 | 2.3 | 32,300 |

Shelf-stability of these compositions is excellent. Color stability on aging is better than for compositions containing dimethyl p-toluidine as compared by standard tests. The odors are only very faint and disappear completely after polymerization. Before addition of the catalyst solution there is substantially no odor.

When the same accelerator is used in amounts of 0.2 and 2.0% by weight, the compressive strengths of the products are somewhat lower in the former case because of less efficient and relatively slow reaction and in the latter because of the difficulty of shaping the test piece before gellation commences.

What is claimed is:

1. A moldable dental restorative composition polymerizable by free radical catalysis having improved stability and consisting essentially of about 72–78% by weight of inorganic non-metallic particulate filler and 28–22% of a liquid polymerizable methacrylate binder containing from 0.2 to 2 weight percent of said binder of N,N-bis(hydroxy-lower-alkyl)-3,5-xylidine as accelerator.

2. Composition according to claim 1 wherein the polymerizable binder is polycarbinol polymethacrylate or polyacrylate.

3. Composition according to claim 2 wherein the particulate filler comprises lithium aluminum silicate.

4. Composition according to claim 2 wherein the accelerator is N,N-bis(2-hydroxyethyl)-3,5-xylidine.

5. Composition according to claim 2 wherein the accelerator is N,N-bis(2-hydroxypropyl)-3,5-xylidine.

6. Composition according to claim 2 wherein the accelerator is N,N-bis(3-hydroxypropyl)-3,5-xylidine.

References Cited

UNITED STATES PATENTS

| 3,234,194 | 8/1966 | Slocum | 260—89.5 |
| 3,452,437 | 1/1969 | Chang | 260—836 |

MORRIS LIEBMAN, Primary Examiner

T. MORRIS, Assistant Examiner

U.S. Cl. X.R.

260—89.5